Patented Dec. 16, 1930

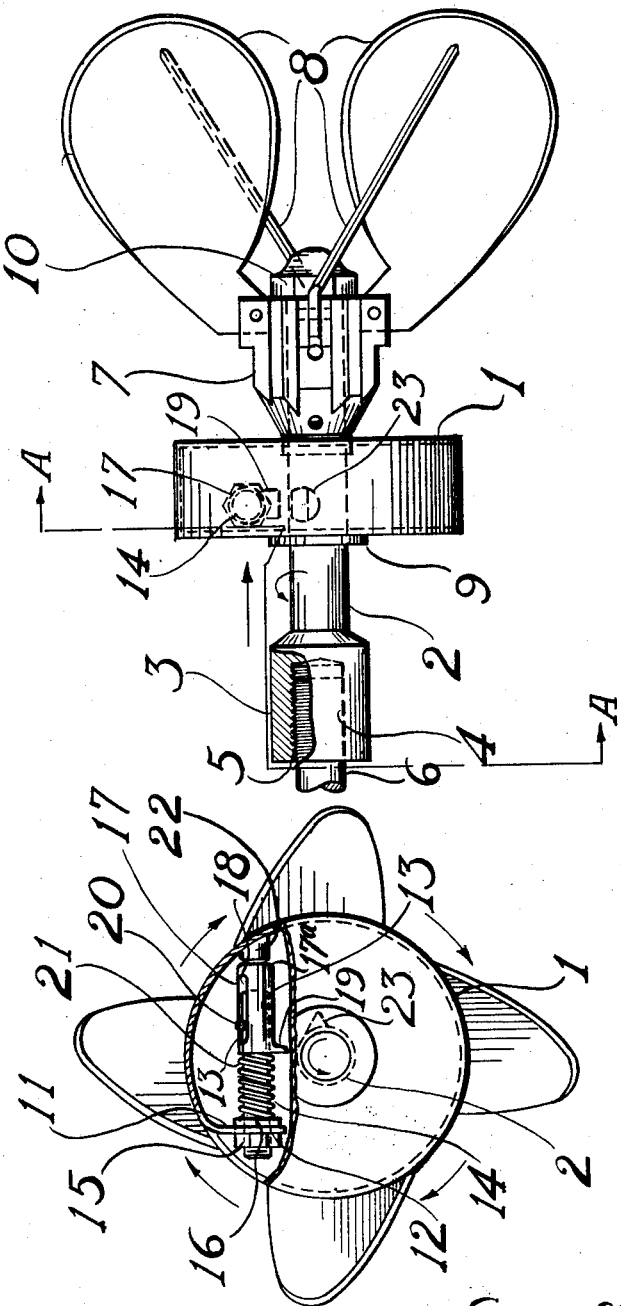

1,785,230

UNITED STATES PATENT OFFICE

GEORGE A. SHANER AND RALPH E. DAMP, OF TULSA, AND GEORGE G. DONOVAN, OF SEMINOLE, OKLAHOMA, ASSIGNORS TO STANDARD OIL DEVELOPMENT COMPANY, A CORPORATION OF DELAWARE

METHOD AND APPARATUS FOR CLEANING PIPE LINES

Application filed September 13, 1929. Serial No. 392,471.

Our invention relates to a method and apparatus for cleaning and locating obstructions in pipe lines thru which fluid material is normally conducted.

Pipe lines, particularly oil or water pipe lines, frequently become obstructed by deposits of various kinds such as sediment, incrustations, paraffin or the like, so as to prevent or greatly reduce the normal flow of fluid thru the line.

A common method for removing such obstructions or coatings in pipe lines is to insert at one end of the line a scraping device, commonly called a go-devil, which will be propelled forward by the fluid in the line and will loosen such sediment or coatings from the walls of the pipe so that they may be carried along by the fluid as it passes thru the pipe, thereby cleaning the pipe line.

It frequently happens that the obstruction in the pipe is so great that the go-devil cannot be forced thru it by the fluid in the line and the device becomes lodged at an intermediate point in the line. In such case it becomes necessary to break the line at this point and remove the obstruction so that the go-devil may be started on again to clean the remaining portion of the pipe line.

It is often difficult to locate the exact or even approximate spot at which the go-devil is lodged.

It is highly desirable, therefore, to provide an indicating device for the go-devil whereby its course thru the line may be followed by a line walker and it is especially desirable that the location of the device in case it becomes lodged, be indicated to the line walker.

Our invention consists in a method and apparatus for indicating at all times to one on the surface of the ground above the pipe line the exact position of a go-devil to which the device is attached and will be fully understood from the following description of a preferred form of our invention and the accompanying drawings in which—

Fig. 1 is a side elevation and

Fig. 2 is a view partly in elevation and partly in cross section taken on the line A—A of Fig. 1.

Referring to the drawings, 1 is a housing mounted for rotation on a shaft 2 having an enlarged portion 3 provided with a bore 4 and internal threads 5 so as to be threaded on to the end of a threaded projection 6 extending from a pipe scraping device (not shown) which may take the form of the usual go-devil used in removing obstructions from or cleaning pipe lines. Secured to the housing 1 is a body member 7 provided with a bore adapted to receive the shaft 2 and adapted to rotate thereon with the housing 1. Secured to the body member 7 we provide turbine or fan blades 8 adjusted to positions such that the fluid flowing past the blades in the pipe line will impart a rotary motion to the body and housing. It may be desirable to mount the body and housing on shaft 2 by means of antifriction bearings altho we have found in actual practice that a smooth bearing surface is generally sufficient. Longitudinal motion of the body and housing on the shaft may be prevented by any suitable means such as the flange 9 and the nut 10.

An arm 11 is secured to the inner surface of the housing 1 by welding or any other suitable means and is provided with an opening 12 adapted to receive a plunger guide 13. This plunger guide may take the form of a metallic rod 14 threaded at one end so as to be secured to the arm 11 by means of nuts 15, 16, or if desired the rod 14 may be made integral with the arm 11 as by welding or in any other suitable manner. Slidably mounted upon the plunger guide is a plunger 17 which may take the form of a tubular member closed at one end as indicated at 17a and provided with a longitudinal slot 18 and a projecting lug 19. A pin 20, secured in the plunger guide 13 is adapted to be slidably received in the slot 20 to prevent relative rotation of the plunger 17 with respect to the plunger guide. A coil spring 21 surrounds one end of the plunger guide and tends normally to hold the plunger against a shoulder or sounding post 22. This sounding post consists of a simple brass or other metallic shoulder which is bolted, welded or otherwise secured to the inner surface of the housing 1 in alignment with the plunger 17 so as to receive the impact therefrom when the plunger is forced forward thereagainst by the spring 21.

A cam shaped member 23 is keyed or otherwise secured to the shaft 2 and serves as a tripper for the plunger 17. As the housing 1 rotates on the shaft in the direction indicated by the arrows the lug 19 rides over the cam 23 drawing the plunger back against the compression of the spring 21. When the lug rides over the point of the cam it is suddenly released and the spring forces the plunger back against the sounding post 22 producing a sharp metallic click. In actual operation it has been found that the housing 1 rotates with such speed that individual impacts cannot be normally distinguished and the sound produced is usually an exceedingly shrill and penetrating whistle-like noise that can be heard distinctly on the surface of the ground even when the device is operating in a pipe line several feet below the surface of the ground.

It has been found moreover that even when the go-devil becomes lodged in the pipe, there is still sufficient movement of the fluid within the pipe to operate the detector device and produce a noise audible to one standing on the surface of the ground above the pipe.

While we have described our invention with respect to certain details, it will be understood that certain modifications of our invention are possible. For instance the actuating means for rotating the housing may take the form of a turbine wheel secured directly to the housing itself, or the housing may be stationary upon the shaft and provided with a spring or other motor for actuating the plunger so as to produce an audible noise.

We therefore contemplate as our invention all such modifications as come within the spirit and scope of the appended claims.

We claim:

1. A method of cleaning pipe lines which comprises placing in the line a cleaning device, propelling the same thru the line and causing the device to energize a separate source of sound waves thereon to emit continuously sound audible at a distance.

2. The method of locating a cleaning device in a pipe line which consists in providing said cleaning device with a mechanical device for producing sounds audible at a distance, said mechanical device being actuated by the motion of the fluid in the said pipe line.

3. A method of locating obstruction in a pipe line which consists in causing to be moved thru the said pipe line by the flow of fluid therein a mechanical device provided with means constituting a separate source of sound waves and adapted to produce continuously sounds audible at a distance.

4. A method of locating obstructions in a pipe line which consists in causing to be moved thru the said pipe line by the flow of fluid therein a mechanical device carrying a separate source of sound waves and adapted to produce sounds audible at a distance, said mechanical device and separate source of sound waves being actuated by the motion of the fluid in the said pipe line.

5. Apparatus for cleaning pipe lines comprising a cleaner, means for propelling the cleaner thru a pipe line, and means comprising a separate source of sound waves and carried by the cleaner for continuously producing sounds audible at a distance.

6. A device for locating obstructions in pipe lines comprising a pipe cleaner provided with mechanical means for producing sounds audible at a distance, said mechanical means being actuated by the motion of the fluid in said pipe line.

7. A device for locating obstructions in a pipe line comprising a sounding post, a spring pressed plunger adapted to contact with said sounding post, and means for causing said plunger to reciprocate so as to hit the said sounding post at regular intervals of time and produce thereby sounds audible at a distance.

8. An indicator for pipe cleaning apparatus comprising a sounding post, a spring pressed plunger adapted normally to contact with said sounding post, and hydraulically actuated means for causing said plunger to repeatedly strike said sounding post so as to produce sounds audible at a distance.

9. An indicator for pipe cleaning apparatus comprising a shaft adapted to be secured to said pipe cleaning apparatus, a housing rotatably mounted upon said shaft, means secured to said housing for rotating said housing by the flow of fluid medium surrounding said pipe cleaning device, a sounding post secured to said housing, a spring pressed plunger mounted in said housing so as to normally rest against said sounding post, and a tripper cam mounted on said shaft and adapted to cause said plunger to reciprocate and repeatedly strike against said sounding post so as to produce sounds audible at a distance as said housing rotates upon said shaft.

GEORGE A. SHANER.
RALPH E. DAMP.
GEORGE G. DONOVAN.